United States Patent
Dunn et al.

(10) Patent No.: US 7,921,449 B2
(45) Date of Patent: Apr. 5, 2011

(54) SMOOTH STILL IMAGE CAPTURE

(75) Inventors: Ted Dunn, Los Gatos, CA (US); James Amendolagine, San Jose, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1909 days.

(21) Appl. No.: 10/402,069

(22) Filed: Mar. 27, 2003

(65) Prior Publication Data
US 2004/0190854 A1    Sep. 30, 2004

(51) Int. Cl.
  *H04N 7/16*    (2006.01)
(52) U.S. Cl. ............................ 725/142; 715/716; 710/52
(58) Field of Classification Search .................. None
  See application file for complete search history.

(56) References Cited

U.S. PATENT DOCUMENTS

| | | | |
|---|---|---|---|
| 6,603,839 B1 * | 8/2003 | Smith et al. | 379/93.23 |
| 6,658,662 B1 * | 12/2003 | Nielsen | 725/109 |
| 2002/0174430 A1 * | 11/2002 | Ellis et al. | 725/46 |
| 2004/0033053 A1 * | 2/2004 | Chen et al. | 386/83 |

\* cited by examiner

*Primary Examiner* — Christopher Kelley
*Assistant Examiner* — Robert Hance
(74) *Attorney, Agent, or Firm* — Haverstock & Owens LLP

(57) ABSTRACT

A live video is directed to a display buffer of the device. The device is preferably a set top box and a live video frame stored in the display buffer is preferably displayed by a display device coupled to the set top box. The display device is preferably a television. A capture command preferably signals the set top box to store one or more frames of the currently displayed live video. Upon receiving the capture command, the live video is paused, thereby preventing the display buffer from loading subsequent live video frames. The live video is then re-directed to a capture buffer, the live video is un-paused, and a current live video frame is captured from the capture buffer. The captured frame is then stored using a conventional storage medium. After the frame is captured, the live video is re-directed from the capture buffer to the display buffer to resume display of the live video.

9 Claims, 4 Drawing Sheets

SMOOTH STILL IMAGE CAPTURE

FIELD OF THE INVENTION

The present invention relates to the field of capturing a still image. More particularly, the present invention relates to the field of smoothly capturing a frame of a live video.

BACKGROUND OF THE INVENTION

When watching a television broadcast or other video program and something of interest is being shown, it is difficult for the viewer to write down the information in the limited amount of time that it is typically displayed. For example, when watching a television broadcast and a telephone number or address is given out, unless the viewer has a writing utensil and paper readily available, it is difficult to get the pencil and paper and write down the information while it is still being displayed. If a video recorder is not already set up to record when the information is displayed, it is also difficult to initiate recording while the information is displayed, due to the mechanical latency inherent in some conventional video recorders, such as a video cassette recorder (VCR).

Other types of conventional video recorders store live video as digital information, much as a personal computer stores information using a hard disk drive. Many such conventional video recorders include the ability to capture an image currently displayed on a television without any mechanical latency. However, unless the video recorder includes sufficient system resources, the process of capturing a displayed image typically causes a visual disturbance on the television while the image is captured. Including the sufficient system resources necessary to overcome these visual disturbances increases the cost of the video recorder.

SUMMARY OF THE INVENTION

Embodiments of the present invention include a process of smoothly capturing a still image of a live video. A live video is directed to a display buffer of a device. The device is preferably a set top box and a live video frame stored in the display buffer is preferably displayed by a display device coupled to the set top box. The display device is preferably a television. A capture command preferably signals the set top box to store one or more frames of the currently displayed live video. Upon receiving the capture command, the live video is paused, thereby preventing the display buffer from loading subsequent live video frames. The live video is then re-directed to a capture buffer, the live video is un-paused, and a current live video frame is captured from the capture buffer. The captured frame is then stored using a conventional storage medium. After the frame is captured, the live video is re-directed from the capture buffer to the display buffer to resume display of the live video.

In one aspect of the present invention, a method of capturing a frame of a live video includes directing the live video to a display buffer, wherein the display buffer stores a current live video frame referenced by a display pointer, pausing the live video upon receiving a screen capture command, thereby displaying a paused frame from the display buffer corresponding to the display pointer, directing the live video to a capture buffer, wherein the capture buffer captures a subsequent live video frame, thereby forming a captured frame, storing the captured frame, and re-directing the live video to the display buffer. Pausing the live video can prevent the display buffer from storing subsequently received live video. The method can also include enabling the capture buffer prior to directing the live video to the capture buffer. The method can also include un-pausing the live video after directing the live video to the capture buffer and prior to the capture buffer capturing the captured frame. The method can also include disabling the capture buffer after re-directing the live video to the display buffer. When directing the live video to the capture buffer, the capture buffer can store a current live video frame referenced by a capture pointer. Disabling the capture buffer can set the capture pointer to the display pointer. Enabling the capture buffer can set a capture pointer to reference the capture buffer. Directing the live video to the capture buffer can include re-directing the live video from the display pointer to the capture pointer. The method can also include displaying the live video after re-directing the live video to the display buffer.

In another aspect of the present invention, a method of capturing a frame of a live video includes directing the live video to a display buffer, wherein a current storage position of the live video is referenced by a capture pointer and a currently displayed frame from the display buffer is referenced by a display pointer, pausing the live video upon receiving a screen capture command, setting the capture pointer to reference a capture buffer, capturing a current live video frame from the capture buffer, and setting the capture pointer to match the display pointer. Pausing the live video can display a paused frame from the display buffer corresponding to the display pointer. Setting the capture pointer to reference the capture buffer can direct the live video to the capture buffer. Setting the capture pointer to match the display pointer can re-direct the live video to the display buffer. The method can also include un-pausing the live video after directing the live video to the capture buffer and prior to the capture buffer capturing the captured frame. Pausing the live video can prevent the display buffer from storing subsequently received live video. Setting the capture pointer to match the display pointer can release the capture buffer. The method can also include displaying the live video after re-directing the live video to the display buffer.

In yet another aspect of the present invention, a method of capturing a frame of a live video includes directing the live video to a display buffer, wherein a current storage position of the live video is referenced by a capture pointer and a currently displayed frame from the display buffer is referenced by a display pointer, pausing the live video upon receiving a screen capture command, thereby displaying a paused frame from the display buffer corresponding to the display pointer, setting the capture pointer to reference a capture buffer, thereby directing the live video to the capture buffer, capturing a current live video frame from the capture buffer, and setting the capture pointer to match the display pointer, thereby re-directing the live video to the display buffer. The method can also include un-pausing the live video after directing the live video to the capture buffer and prior to the capture buffer capturing the captured frame. Pausing the live video can prevent the display buffer from storing subsequently received live video. Setting the capture pointer to match the display pointer can release the capture buffer. The method can also include displaying the live video after re-directing the live video to the display buffer.

In still yet another aspect of the present invention, an apparatus to capture a frame of a live video includes an input/output (I/O) circuit to receive a screen capture command and the live video, a display buffer, a capture buffer, and a controller coupled to the I/O circuit, the display buffer and the capture buffer such that in operation the live video is directed to the display buffer from the I/O interface, wherein a current storage position of the live video is referenced by a capture pointer and a currently displayed frame from the display buffer is referenced by a display pointer, and upon receiving the screen capture command the live video is paused, the capture pointer is set to reference the capture buffer, a current live video frame from the capture buffer is captured, and the capture pointer is set to match the display pointer. The apparatus can comprise a set top box. The I/O interface can provide an external connection to a display device to display the live video received from the display buffer. The live video can be directed from the display buffer via the I/O interface to an external display device. The display buffer can maintain a paused frame referenced by the display pointer in response to pausing the live video. The live video can be directed to the capture buffer in response to setting the capture pointer to match the display pointer. The live video can be re-directed to the display buffer in response to setting the capture pointer to match the display pointer. The live video can be un-paused after directing the live video to the capture buffer and prior to the capture buffer capturing the captured frame. The capture buffer can be released in response to setting the capture pointer to match the display pointer.

In another aspect of the present invention, a set top box to capture a frame of a live video includes an input/output (I/O) circuit to receive a screen capture command and the live video, a display buffer, a capture buffer, and a controller coupled to the I/O circuit, the display buffer and the capture buffer such that in operation the live video is directed to the display buffer from the I/O interface, wherein a current storage position of the live video is referenced by a capture pointer and a currently displayed frame from the display buffer is referenced by a display pointer, and upon receiving the screen capture command the live video is paused, the capture pointer is set to reference the capture buffer, a current live video frame from the capture buffer is captured, and the capture pointer is set to match the display pointer. The I/O interface can provide an external connection to a display device to display the live video received from the display buffer. The live video can be directed from the display buffer via the I/O interface to an external display device. The display buffer can maintain a paused frame referenced by the display pointer in response to pausing the live video. The live video can be directed to the capture buffer in response to setting the capture pointer to match the display pointer. The live video can be re-directed to the display buffer in response to setting the capture pointer to match the display pointer. The live video can be un-paused after directing the live video to the capture buffer and prior to the capture buffer capturing the captured frame. The capture buffer can be released in response to setting the capture pointer to match the display pointer.

In yet another aspect of the present invention, a network of devices to capture a frame of a live video includes a source device, a display device, and a set top box coupled to the source device and the display device, the set top box comprising an input/output (I/O) circuit to receive a screen capture command and the live video from the source device, a display buffer, a capture buffer, and a controller coupled to the I/O circuit, the display buffer and the capture buffer such that in operation the live video is directed to the display buffer from the I/O interface, wherein a current storage position of the live video is referenced by a capture pointer and a currently displayed frame from the display buffer is referenced by a display pointer and displayed on the display device, and upon receiving the screen capture command the live video is paused, the capture pointer is set to reference the capture buffer, a current live video frame from the capture buffer is captured, and the capture pointer is set to match the display pointer can be directed from the display buffer via the I/O interface to an external display device. The display buffer can maintain a paused frame referenced by the display pointer in response to pausing the live video. The live video can be directed to the capture buffer in response to setting the capture pointer to match the display pointer. The live video can be re-directed to the display buffer in response to setting the capture pointer to match the display pointer. The live video can be un-paused after directing the live video to the capture buffer and prior to the capture buffer capturing the captured frame. The capture buffer can be released in response to setting the capture pointer to match the display pointer. The source device can comprise a cable service provider, a satellite service provider, or a content source coupled to the internet. The display device can be a television or a personal computer.

DETAILED DESCRIPTION OF THE EMBODIMENTS

Embodiments of the present invention include a process of capturing a still image of a live video while maintaining a smooth display. Preferably, the process of the present invention is used by a device with limited processing power and/or limited memory. A live video is directed to a display buffer of the device. The device is preferably a set top box and a live video frame stored in the display buffer is preferably displayed by a display device coupled to the set top box. The display device is preferably a television. A user preferably uses a remote control device to send a capture command to the set top box. The capture command preferably signals the set top box to store one or more frames of the currently displayed live video. Upon receiving the capture command, the live video is paused, thereby preventing the display buffer from loading subsequent live video frames. The live video is then re-directed to a capture buffer, the live video is un-paused, and a current live video frame is captured from the capture buffer. The captured frame is then stored using a conventional storage medium. Capturing the frame requires processing and related manipulation of the frame.

In conventional systems, it is this processing and manipulation that causes visual disturbance on the display while a frame is being captured. Using the process of the present invention, such visual disturbances are minimized, if not completely eliminated. After the frame is captured, the live video is re-directed from the capture buffer to the display buffer. Until this point, the display buffer maintained the same frame that had been previously loaded at the point where the live video was paused, effectively pausing display of the live video on the display device. Once the live video is re-directed to the display buffer, a current live video frame is loaded into the display buffer, thereby resuming display of the live video on the display device.

Figure 1:
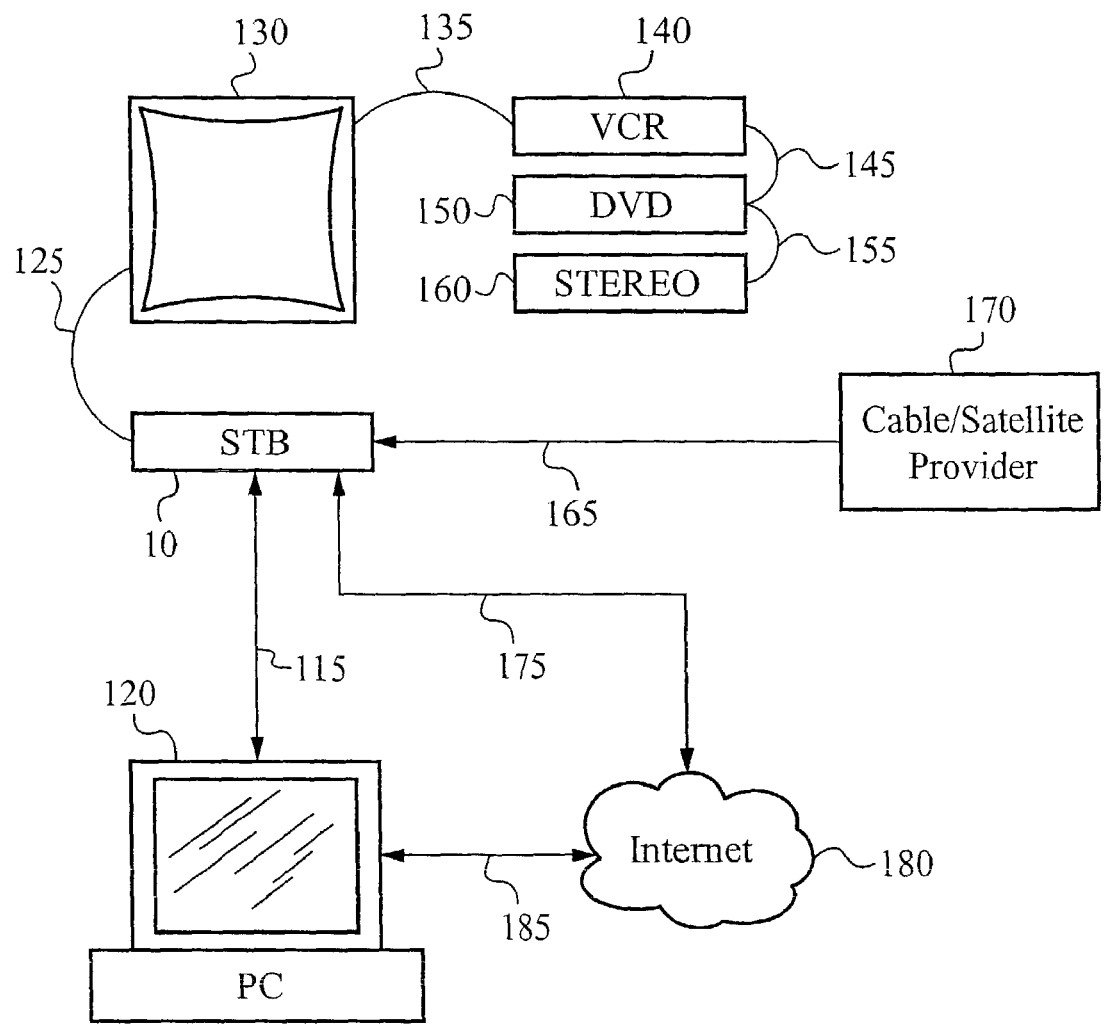
FIG. 1 illustrates an exemplary network of devices.

FIG. 1 illustrates an exemplary network of devices including a stereo receiver 160, a DVD player 150, a video cassette recorder (VCR) 140, a set top box (STB) 10, a television 130, a computer 120, a cable/satellite provider 170 and the Internet 180 connected together by network connections 115, 125, 135, 145, 155, 165, 175, and 185. The network connection 155 couples the stereo receiver 160 to the DVD player 150. The network connection 145 couples the DVD player 150 to the VCR 140. The network connection 135 couples the VCR 140 to the television 130. The network connection 125 couples the television 130 to the STB 10. The network connection 115 couples the STB 10 to the PC 120. The network connection 165 couples the STB 10 to the cable/satellite provider 170. The network connection 175 couples the STB 10 to the Internet 180. The network connection 185 couples the PC 120 to the Internet 180.

The configuration illustrated in FIG. 1 is exemplary only. It should be apparent that an audio/video network could include many different combinations of components. It should also be apparent that network connections 115, 125, 135, 145 and 155 can be of any conventional type, including but not limited to ethernet, IEEE 1394-2000, or wireless. Network connections 165, 175 and 185 can be of any conventional type sufficient to provide a connection to a remote content source, including but not limited to the public switched telephone network, cable network, and satellite network.

Figure 2:
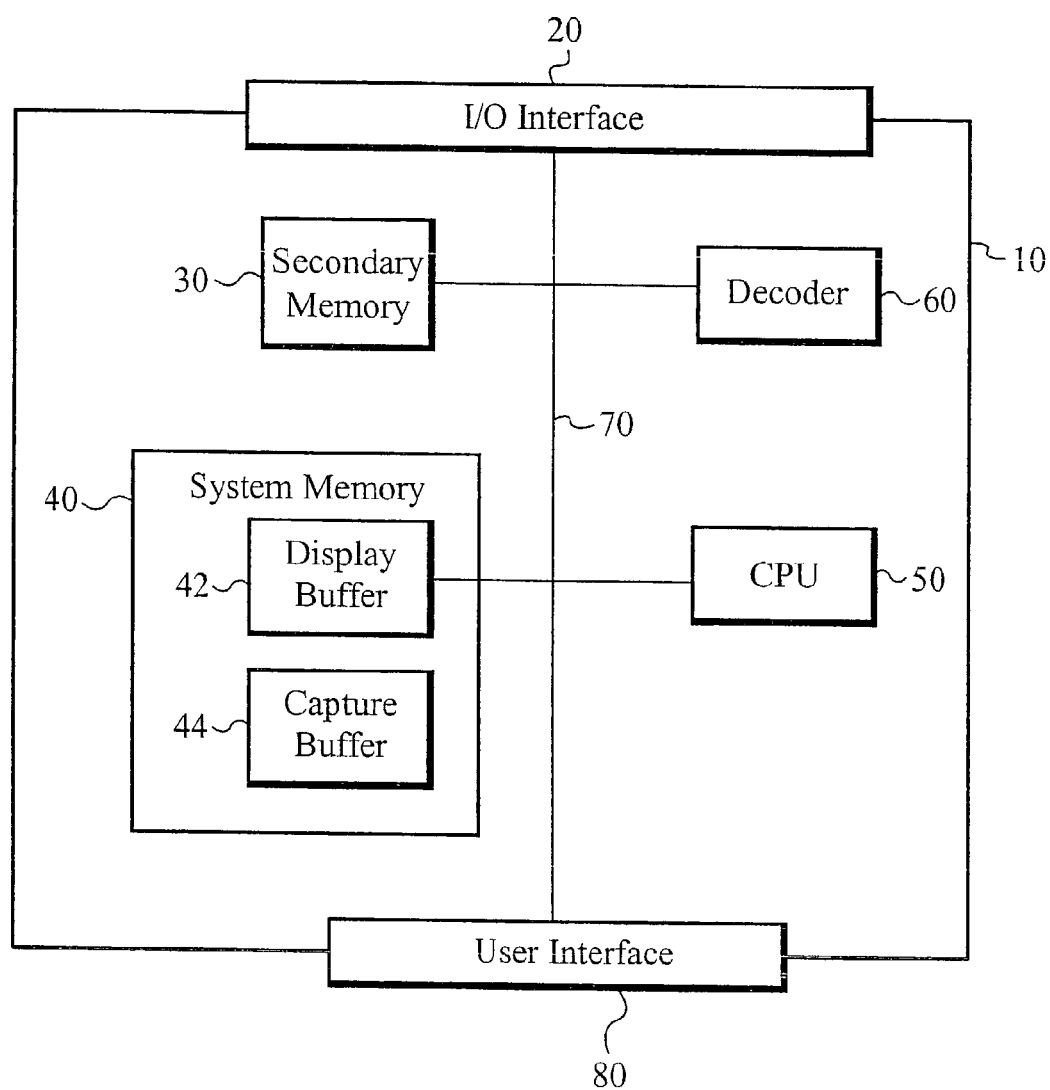
FIG. 2 illustrates an exemplary set-top box according to the present invention.

FIG. 2 illustrates an exemplary set-top box according to the present invention. The set-top box preferably controls the transmission of multimedia from a local storage device, such as a personal computer (PC), to a television or from a remote content provider, such as a cable television provider, to the television. The set-top box 10 includes an input/output (I/O) interface 20, a secondary memory 30, a system memory 40, a central processing unit (CPU) 50, a user interface 80, and a decoder 60 all coupled via a bi-directional bus 70. The I/O interface 20 preferably couples the set-top box 10 to a content source (not shown) for receiving multimedia and to the television (not shown) or other display device for displaying the multimedia received from the content source. The I/O interface 20 can also be coupled to a conventional network, such as the Internet, to receive periodic software upgrades including new versions of operating software and new or upgraded applications. The I/O interface 20 also sends and receives control signals to and from the user interface 80 and the television. The user interface 80 preferably comprises a keypad and display, as is well known in the art. Alternatively, the user interface 80 comprises any conventional user interface.

The secondary memory 30 stores the software used to enable operation of the set-top box 10 along with a plurality of applications. Exemplary applications include, but are not limited to a menu of available content such as an on-screen television guide, and display parameter settings such as color, tint, and brightness. Preferably, the secondary memory 30 is flash memory. Alternatively, any conventional type of memory can be used. Preferably, the system memory 40 includes random access memory (RAM). The system memory 40 can also include additional buffers, registers, and cache according to specific design implementations. In the preferred embodiment of the present invention, the system memory 40 includes a display buffer 42 and a capture buffer 44. Content to be displayed by the display device is retrieved from the display buffer 42. Portions of the content to be captured as stored images are directed to the capture buffer 44, as will be explained in greater detail below. Multimedia received by the set-top box 10 is preferably encrypted to prevent unauthorized access and use, and the decoder 60 decrypts the multimedia according to access authorization provided by the CPU 50.

In operation, the set top box 10 receives a live video feed via the I/O interface 20. The live video is decoded by the decoder 60. As each frame is decoded by the decoder 60, the decoded frame is stored in system memory 40. The starting address for a most currently stored frame of the live video is referenced by a capture pointer. In this manner, live video is directed to the capture pointer. In other words, the live video is directed to the current address referenced by the capture pointer. In a standard operation mode, the capture pointer references the display buffer 42 within the system memory 40 such that as each frame is decoded, it is loaded into the display buffer 42. Preferably, a single frame is stored in the display buffer 42 at a given time. The frame stored in the display buffer 42 is the frame currently displayed by the display device coupled to the set top box 10. A starting address of the display buffer 42 is referenced by a display pointer. In other words, the display pointer references a memory position which includes the frame currently displayed by the display device. In the standard operation mode, the display pointer and the capture pointer reference the same address. In an alternative embodiment, one or more frames are stored in the display buffer 42 at a given time, and the currently displayed frame is referenced by the display pointer.

Figure 3:
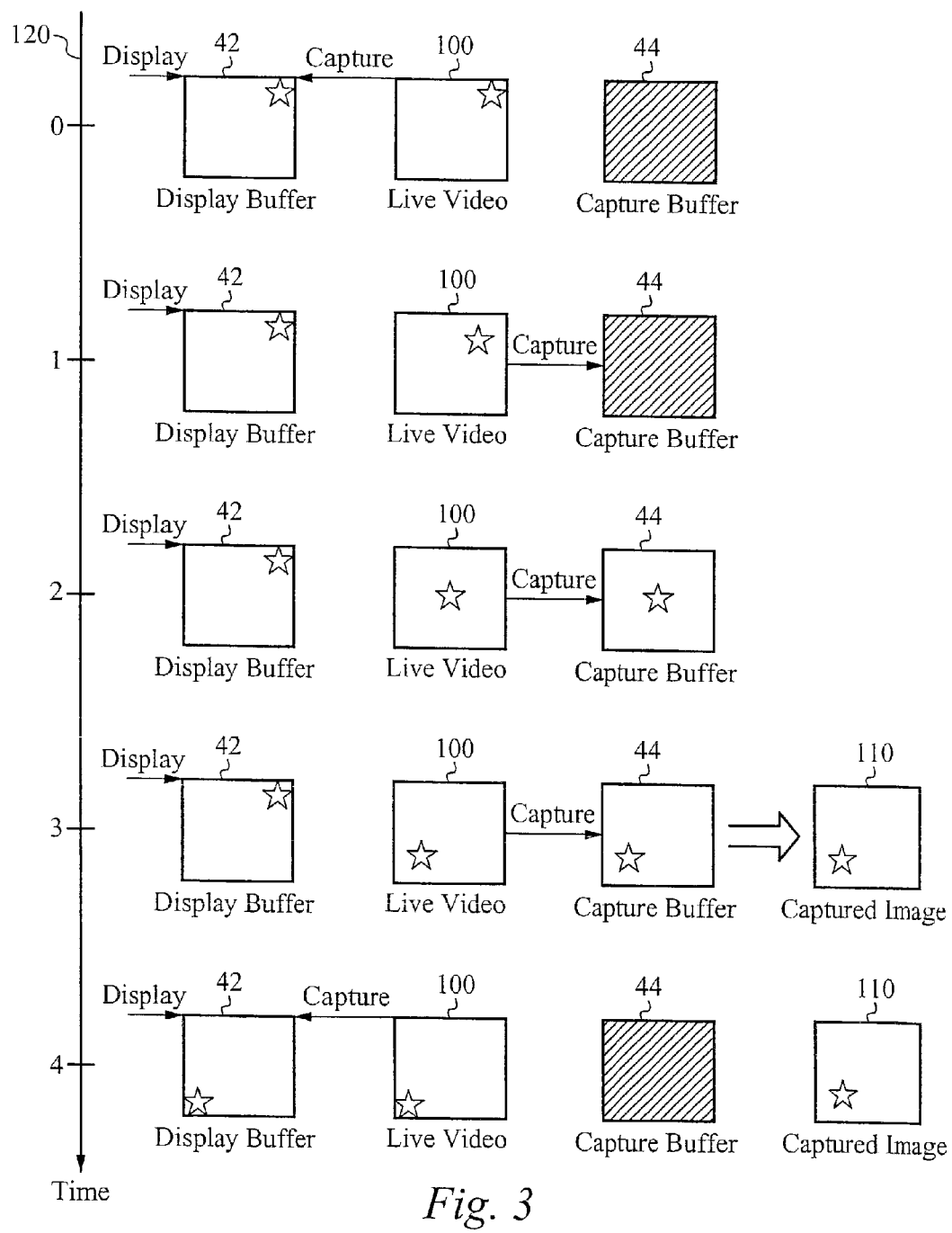
FIG. 3 illustrates a state diagram showing a sample operation of the present invention

FIG. 3 illustrates a timing diagram for describing the operation of the preferred embodiment of the present invention. For the sake of simplicity and clarity, common elements shown in FIGS. 1-3 also share common reference numerals. For example, the display buffer 42 and the capture buffer 44 are common in both FIGS. 2 and 3. In this timing diagram, the display buffer 42 and the capture buffer 44 are described in context with the overall functionality of the set top box 10. As shown in FIG. 3, the timing diagram illustrates interaction between the display buffer 42, the capture buffer 44, and a live video 100. The live video 100 is received by the set top box 10 for display on a display device coupled to the set top box 10. A time line 120 indicates a progression of time as measured in time increments. Preferably, each time increment measures a uniform period of time and each time increment corresponds to a single frame of live video as the live video progresses forward uninterrupted. Alternatively, each time increment is not a uniform period of time and is meant to signify a change in state of the capture buffer 44, the display buffer 42, the capture pointer, and the display pointer. In the timing diagram of FIG. 3, the time line 120 includes time increments time 0 through time 4.

Prior to time 0, the set top box 10 is operating in the standard operation mode in which a live video 100 is directed to the capture pointer, which references the display buffer 42. Since the display pointer also references the display buffer 42, the capture pointer and the display pointer reference the same address while the set top box 10 operates in the standard operation mode. At time 0, a signal is sent to the set top box 10 to capture a frame of the live video 100. Preferably, the signal is sent by pressing a button on a remote control device. Upon the set top box 10 receiving the signal, the live video 100 is paused. Pausing the live video 100 refers to pausing the storage of the live video 100 within the system memory 40. Pausing the live video does not refer to pausing the actual live video feed to the set top box 10. The live video 10 continues to be sent to the set top box 10 whether or not the live video 10 is paused within the set top box 10. As illustrated at time 0, the capture buffer 44 is shaded to indicate that no data is stored, and the current live video frame 100 is the same as the currently displayed frame stored in the display buffer 42.

At time 1, the capture pointer is changed to reference the capture buffer 44. Since the capture pointer no longer references the display buffer 42, no subsequent live video frames are directed to and loaded into the display buffer 42. As a result, the frame stored in the display buffer 42 at time 0 remains in the display buffer 42 at time 1. This effectively pauses the display on the frame stored in the display buffer 42 at time 0. The display pointer indicates what is displayed on the display device and the capture pointer indicates where the live video 100 is directed. At time 0, the live video 100 remains paused so that no subsequent live video frames are stored in the system memory 40, which includes display buffer 42 and capture buffer 44. As a result, the capture buffer 44 continues to remain empty at time 1, despite the live video 100 continuing forward, as indicated in FIG. 3 by the star in the live video 100 moving diagonally down and to the left when referencing time 1 to time 0.

At time 2, the live video 100 is un-paused. Since the capture pointer is not directed to the display buffer 42, un-pausing the live video 100 does not impact the display buffer 42 and the same frame that was stored in display buffer 42 at time 1 remains in the display buffer at time 2. However, the capture pointer is directed to the capture buffer 44 so that once the live video 100 is un-paused, the capture buffer receives the current live video frame 100.

At time 3, the capture buffer 44 captures the current live video frame 100 as captured image 110. The captured image 110 is the same frame as the current live video frame 100 and a current frame stored in the capture buffer 44, as illustrated by the position of the star in each of these frames at time 3. Capturing the frame sets off the captured image from the capture buffer. The captured image 110 can be stored in any conventional manner including a memory stick, a hard disk drive, flash memory or RAM. The frame stored in display buffer 42 at time 2 remains stored in display buffer 42 at time 3.

At time 4, the live video 100 is re-directed to the display buffer 42 by changing the capture pointer to reference the display buffer 42. Re-directing the live video 100 to the display buffer 42 sets the set top box 10 back to the standard operation mode. As such, the capture pointer and the display pointer reference the same address, which is the display buffer 42, and display of the live video 100 continues. By changing the capture pointer to reference the display buffer 42, the capture buffer 44 is released. Preferably, when the capture buffer 44 is released, it is cleared of content, as indicated by the shading in FIG. 3 at time 4. Alternatively, the capture buffer 44 is not cleared upon releasing the capture buffer 44; instead, the content of the capture buffer 44 is overwritten the next time memory associated with the capture buffer 44 is used.

Figure 4:
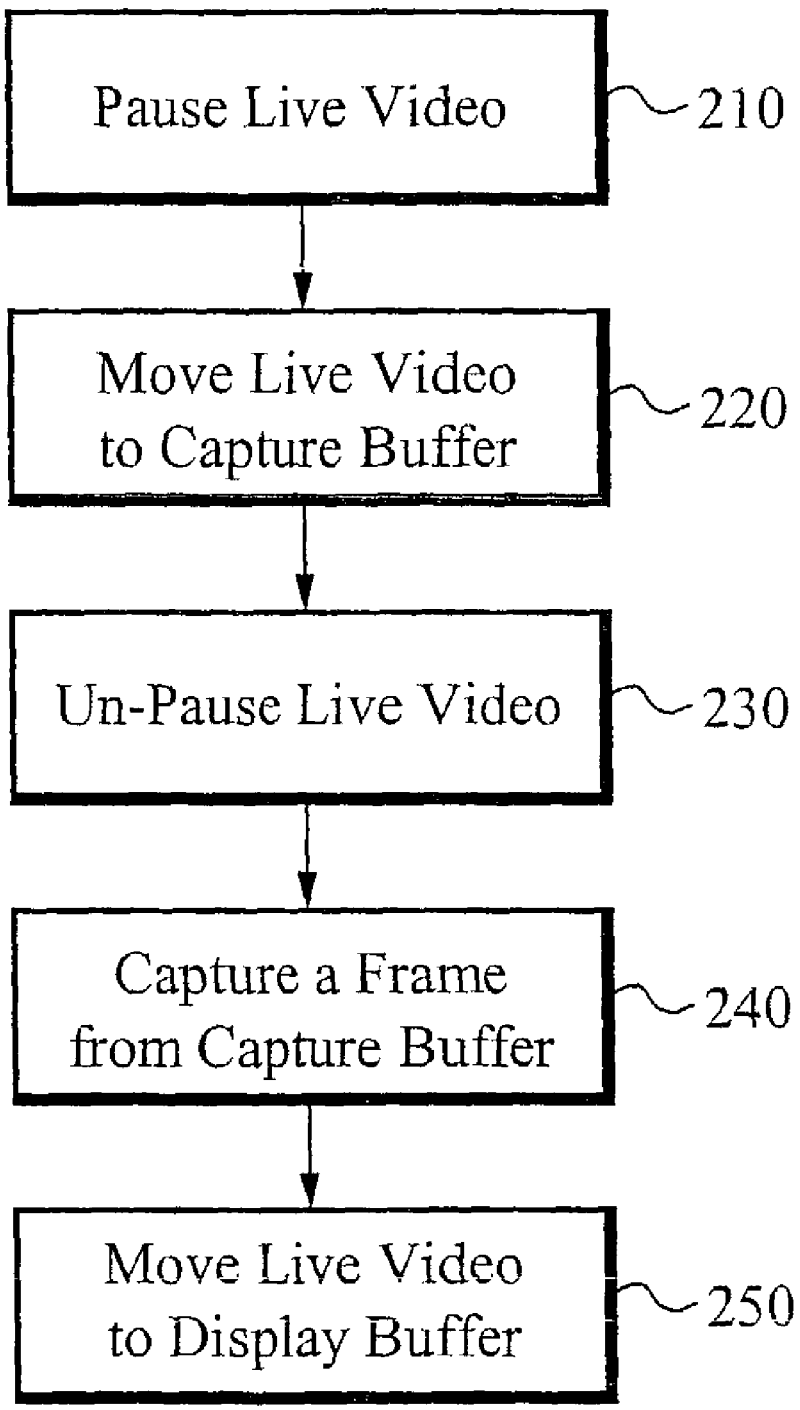
FIG. 4 illustrates a process of smoothly capturing a still image from a live video according to the preferred embodiment of the present invention.

FIG. 4 illustrates a process of smoothly capturing a still image from a live video according to the preferred embodiment of the present invention. The live video is preferably received by a set top box. The set top box preferably includes a display buffer and a capture buffer, as described in detail above. The live video is decoded within the set top box and provided to the display buffer for display on a display device coupled to the set top box. At the step 210, the live video is paused in response to receiving a capture command. Preferably, the capture command is sent to the set top box by a remote control device. Although the live video continues to be sent to the set top box, pausing the live video prevents further live video frames from being loaded into the display buffer. As a result, display of the live video is paused on the live video frame stored in the display buffer and the point where the live video is paused. At the step 220, the live video is re-directed to the capture buffer. At this point, the live video remains paused such that the capture buffer is prevented from loading a current live video frame, although the live video continues to be sent to the set top box. At the step 230, the live video is un-paused such that the capture buffer loads a current live video frame. Since the live video is directed to the capture buffer and not the display buffer at this point, the frame stored in the display buffer at the step 210 continues to be stored in the display buffer despite un-pausing the live video at the step 230. At the step 240, a current live video frame in the capture buffer is captured. Capturing a frame includes setting off the frame from the capture buffer so that the captured frame can be stored. Storing the captured frame can be accomplished using any conventional storage means, including but not limited to a hard disk drive within the set top box, an externally coupled hard disk drive, or a memory stick. At the step 250, the live video is re-directed to the display buffer so that a current live video frame is displayed. Re-directing the live video to the display buffer releases the capture buffer, as the capture buffer is no longer needed. The process illustrated in FIG. 4 is preferably used by a device with limited system resources, such as limited processing power and/or limited memory.

In operation, a live video is directed to a display buffer of a device. The device is preferably a set top box and a live video frame stored in the display buffer is preferably displayed by a display device coupled to the set top box. The display device is preferably a television. A user preferably uses a remote control device to send a capture command to the set top box. The capture command preferably signals the set top box to store a single frame of the currently displayed live video. Upon receiving the capture command, the live video is paused, thereby preventing the display buffer from loading subsequent live video frames. As a result, the frame currently loaded in the display buffer remains in the display buffer, effectively pausing the display on that frame. After pausing the live video, the live video is re-directed to a capture buffer; however, since the live video is still paused, the capture buffer is prevented from loading a current live video frame. The live video is then un-paused, enabling the capture buffer to load a current live video frame. The live video frame loaded in the capture buffer is then captured by setting off the live video frame from the capture buffer. The captured frame is then stored using any conventional storage means. The live video is then re-directed from the capture buffer to the display buffer. Until this point, the display buffer maintained the same frame that had been previously loaded at the point where the live video was paused, effectively pausing display of the live video on the display device. Once the live video is re-directed to the display buffer, a current live video frame is loaded into the display buffer, thereby resuming display of the live video on the display device.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention. Specifically, it will be apparent to one of ordinary skill in the art that while the preferred embodiment of the present invention is used with set-top boxes, the present invention can also be implemented on any other appropriate system resource limited device.

What is claimed is:

1. An apparatus to capture a frame of a live video, the apparatus comprising:
   a. an input/output (I/O) circuit to receive a screen capture command and the live video;
   b. a display buffer;
   c. a capture buffer; and d. a controller coupled to the I/O circuit, the display buffer and the capture buffer such that in operation the live video is directed to the display buffer from the I/O interface, wherein a current storage position of the live video is referenced by a capture pointer and a currently displayed frame from the display buffer is referenced by a display pointer, and upon receiving the screen capture command the live video is paused, the capture pointer is set to reference the capture buffer, a current live video frame from the capture buffer is captured and stored as an image, and the capture pointer is set to match the display pointer;

wherein the capture buffer is released in response to setting the capture pointer to match the display pointer.

2. The apparatus of claim 1 wherein the apparatus comprises a set top box.

3. The apparatus of claim 1 wherein the I/O interface provides an external connection to a display device to display the live video received from the display buffer.

4. The apparatus of claim 1 wherein the live video is directed from the display buffer via the I/O interface to an external display device.

5. The apparatus of claim 1 wherein the display buffer maintains a paused frame referenced by the display pointer in response to pausing the live video.

6. The apparatus of claim 1 wherein the live video is directed to the capture buffer in response to setting the capture pointer to match the display pointer.

7. The apparatus of claim 6 wherein the live video is redirected to the display buffer in response to setting the capture pointer to match the display pointer.

8. The apparatus of claim 6 wherein the live video is unpaused after directing the live video to the capture buffer and prior to the capture buffer capturing the captured frame.

9. An apparatus to capture a frame of a live video, the apparatus comprising:
   a. an input/output (I/O) circuit to receive a screen capture command and the live video;
   b. a display buffer;
   c. a capture buffer; and
   d. a controller coupled to the I/O circuit, the display buffer and the capture buffer such that in operation the live video is directed to the display buffer from the I/O interface, wherein a current storage position of the live video is referenced by a capture pointer and a currently displayed frame from the display buffer is referenced by a display pointer, and upon receiving the screen capture command the live video is paused, the capture pointer is set to reference the capture buffer, a current live video frame from the capture buffer is captured and stored as an image, and the capture pointer is set to match the display pointer;

wherein the capture buffer is cleared of content when the capture pointer is set to reference the display buffer.

* * * * *